United States Patent

[11] 3,580,307

| [72] | Inventor | Nicolae Minetos<br>Bucharest, Romania |
|---|---|---|
| [21] | Appl. No. | 783,195 |
| [22] | Filed | Dec. 12, 1968 |
| [45] | Patented | May 25, 1971 |
| [73] | Assignee | Institutul De Cercetari Stiintifice Pentru<br>Protectia Muncii<br>Bucharest, Romania |
| [32] | Priority | Dec. 12, 1967 |
| [33] | | Romania |
| [31] | | 55,314 |

[54] PROTECTION DEVICE FOR A CIRCULAR CUTTING SAW
10 Claims, 3 Drawing Figs.

[52] U.S. Cl.................................................... 143/159,
83/544
[51] Int. Cl...................................................... B27g 19/02
[50] Field of Search............................................ 143/159,
159-3, 159-3.1, 159-3.2, 159-8, 159-10, 159-11,
159-12; 144/251, 251-1; 83/478, 544; 51/268,
272, 274

[56] References Cited
UNITED STATES PATENTS
1,797,907  3/1931  Drysdale .......................  143/159
FOREIGN PATENTS
217,380  9/1958  Australia ........................  143/159-11
10,114  6/1900  Great Britain ................  143/159-3
107,118  12/1899  France ..........................  143/159-11
164,457  12/1905  Germany......................  143/159

Primary Examiner—Andrew R. Juhasz
Assistant Examiner—Leon Gilden
Attorney—Spencer & Kaye ABSTRACT: Safety device for use with a circular cutting saw in which a support means is provided forwardly of the saw with respect to the direction in which a workpiece is fed thereto. A pulley means is rotatably mounted on the support means forwardly of the saw and feeler is rotatable connected to the pulley means and extends forwardly of the saw into the path of a workpiece being fed thereto. A guard means connected to the support means covers the saw and includes a slideable guard member which is movable into and out of a safety position covering the forward edge of the saw. Cable means connects the pulley means to the slideable guard member. Thus, when the feeler means is contacted by a workpiece being fed to the saw and is caused to rotate toward the saw the pulley means is rotated causing the cable means to move the slideable guard member out of its safety position to an extent which is a function of the angle through which the feeler means is rotated by the workpiece being moved toward the saw.

Inventor
Nicolae Minetos

By Spencer & Kaye
Attorneys.

Inventor
Nicolae Minetos

By Spencer & Kaye
Attorneys.

PROTECTION DEVICE FOR A CIRCULAR CUTTING SAW

BACKGROUND OF THE INVENTION

The present invention relates to a safety device for a circular cutting saw and, more particularly, for such a saw which is used for cutting strips of wood. The circular cutting saw is mounted with reference to a fixed surface associated with it, on a fixed shaft.

According to known safety devices for circular cutting saws which are mounted on a fixed shaft with reference to an associated fixed surface there is provided a fixed metallic guard member which covers the entire rear half of a circular saw in its entirety and a tilting guard member connected thereto which, while in a rest position, protects the lateral sides of the saw.

One of the significant disadvantages of known safety devices is that they do not provide sufficient protection particularly during the sawing operation. Known safety devices are so constructed that when they uncover the portion of the saw teeth which do the actual cutting, they also uncover a portion of the saw teeth which is situated above the workpiece being sawed. This, of course, is an unsafe condition and increases the likelihood of the occurrence of an accident.

Yet another disadvantage of known safety devices is the fact that waste materials which are generated by the sawing operation are not kept clear of the blade. It has been found that such waste materials may get between the saw blade and the fixed guard. This requires the saw operator to remove such materials. Thus, known safety devices, themselves, are instrumental in creating a relatively dangerous situation.

Still another disadvantage of known safety devices is that waste materials generated by the sawing operation may be hurled by the teeth of the spinning blade toward the saw operator or workers in the vicinity of the saw.

Another disadvantage of known safety devices is that the fixed metallic guard at the rear of the saw blade limits the extent to which the cutting height of the saw blade can be adjusted. This, in turn, determines the maximum height of the workpiece which can be cut by that particular sawing apparatus.

Another disadvantage of prior art safety devices is that some of the sawdust generated during the cutting operations is thrown toward the saw operator by the saw, this due to the forward part of the saw not being covered at all.

SUMMARY OF THE INVENTION

The object of the present invention is therefore to provide a safety device which is constructed to avoid the above-discussed disadvantages.

The safety device contemplated by the present invention accomplishes this object by providing a construction which includes a support means extending forwardly of the saw with respect to the direction in which a workpiece is fed to the saw. A pulley means is rotatably mounted on the support means forwardly of the saw and feeler means connected to the pulley means for rotation therewith. The feeler means extends forwardly of the saw in the path of the workpiece being moved toward the saw. A guard means which is connected to the support means covers the saw and includes a slideable guard member which is movable into and out of a safety position in which it covers the forward edge of the saw. The pulley means is connected to the slideable guard member by a cable means in such a manner that when the feeler means id contacted by a workpiece being fed to the saw and is rotated toward the saw, it causes the pulley means to rotate and thereby move the slideable guard member via the cable means. The slideable guard member is moved out of its safety position by a factor which is a function of the angle through which the feeler means is rotated by the workpiece being moved toward the saw.

Further aspects of the present invention provide that the feeler means is in the form of a double signaling device, i.e., formed of two rotatable arms, which transmit a rotating motion to a shaft connected to the pulley means. The shaft itself is mounted on a support means formed of two support members one on each side of the saw. Moreover, the pulley means is in the form of a pulley rigidly mounted on the shaft for rotation therewith. The sliding guard member, according to the present invention, has a connecting element in the form of a piece with a hole provided therethrough to which the cable of the cable means is connected. It is also contemplated that the slideable guard member, which is movable into and out of a safety position automatically after the workpiece is sawed.

DESCRIPTION OF THE PREFERRED EMBODIMENT

Figure 1:
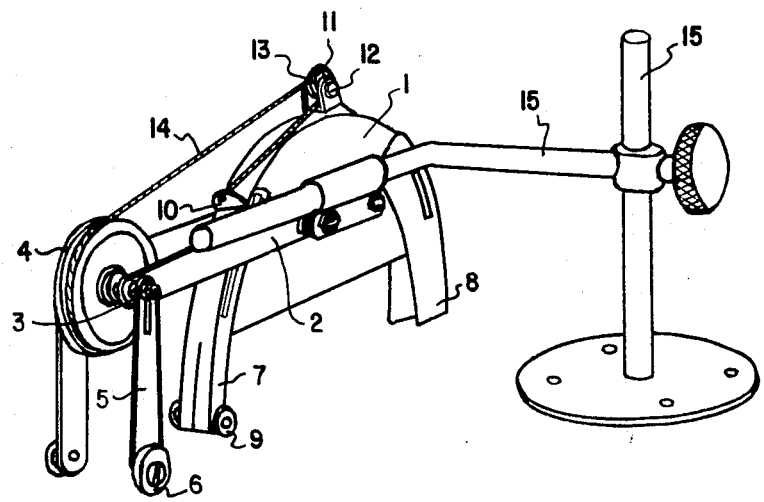
FIG. 1 is a perspective view of the safety device according to the present invention.

Referring to FIG. 1, the safety device according to the present invention is shown therein. As can be seen, there is provided a support means including members 15 and two rigid, extensive support members 2. The support members 2 extend forwardly of the saw (not shown) with respect to the direction in which a workpiece is fed to the saw. A rotatable shaft is mounted near the free ends of these support members 2 and a pulley is rigidly disposed on the shaft for rotation therewith. The feeler means of the safety device includes two feeler arms 5, each of which has an end connected to the shaft 3 for rotation therewith. A roller 6 is provided on the free end of each feeler arm 5; the rollers 6 facilitating the passing of a workpiece under the feeler arms 5 while it is moved toward the saw.

A guard means including fixed guard member 1 and slideable guard members 8 and 9 is connected to the support means and located over the circular saw (not shown). The slideable guard members 7 and 8, are provided at the forward and rearward ends, respectively, of the fixed guard member 1, with respect to the direction in which material is fed to the saw. The forward slideable guard member 7 has two rollers 9 disposed on the free end thereof and a connecting element 10 in the form of a piece having a hole provided through it.

A cable means is provided which includes a cable 14 wound around the pulley 4 and a pulley assembly having a pulley 13 disposed on a shaft 12 which is mounted on a bracket member 11. The bracket member 11 is itself attached to the top of the fixed guard member 1. The pulley 13 is freely rotatable. The pulley assembly of the cable means is thus provided rearwardly of both the pulley 4 and the slideable guard member 7. The cable 14 is wound around the pulley 4 to reach rearwardly toward the pulley 13 of the pulley assembly. The cable 14 is then wound at least partially around the pulley 13 reaching forwardly again to be connected to the connecting element 10 on the slideable guard member 7.

The support members 15 of the present invention serve to fix the safety device above the circular saw (not shown). Moreover, the support members 15 are provided with means for vertically and horizontally adjusting the same relative to the saw.

Figure 2:
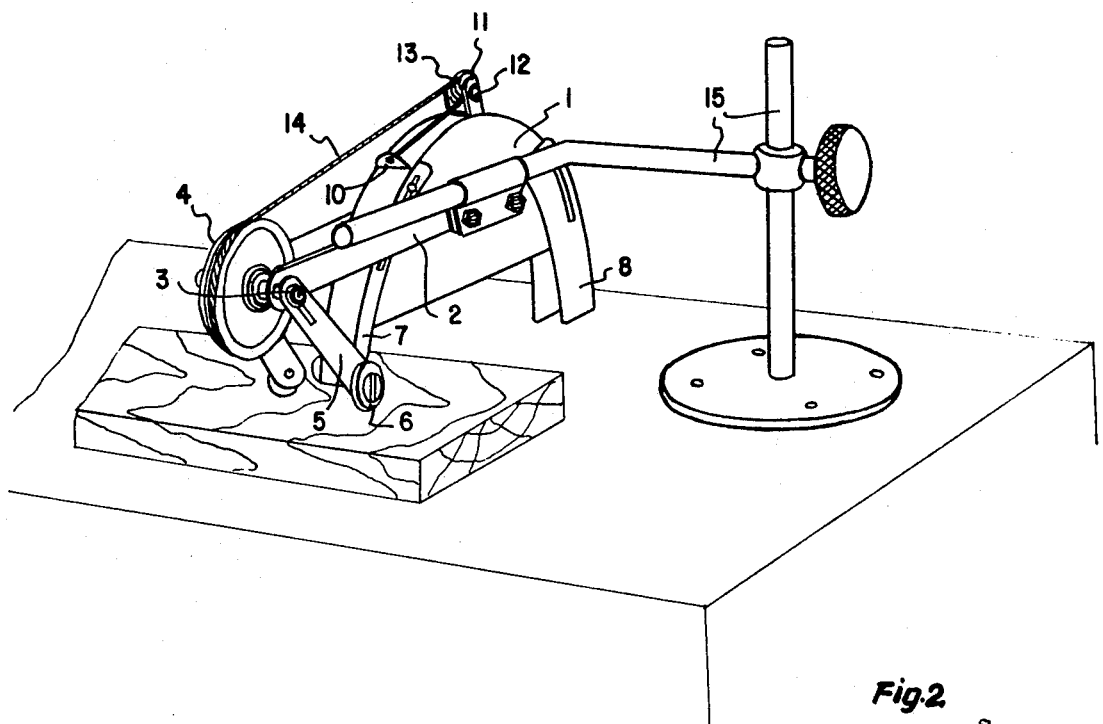
FIG. 2 is a perspective view of the safety device according to the present invention showing its arrangement with respect to a workpiece at the start of a sawing operation.

Referring to FIG. 2, this illustrates the safety device according to the present invention in operation. Specifically, FIG. 2 represents the arrangement of the safety device with respect to a workpiece at the start of a sawing operation. As can be seen, the rotatable feeler arms 5 are rotated and disposed on the top surface of the workpiece as it is pushed toward the saw (not shown). The rotation of the feeler arms 5 results in rotating the shaft 3 to which they are connected. This in turn, results in rotating the pulley 4 and in pulling the cable 14 which is wound around the pulley 4. The cable 14 exerts a force; via the pulley assembly, on the slideable guard member 7 to move the same out of a safety position covering the forward edge of the saw. The slideable guard member is moved out of the safety position to an extent which is a function of the angle through which the feeler means is rotated by the workpiece being moved toward the saw. As can be seen, the slideable member 7 is also mounted on top of the workpiece, during the sawing operations.

Figure 3:
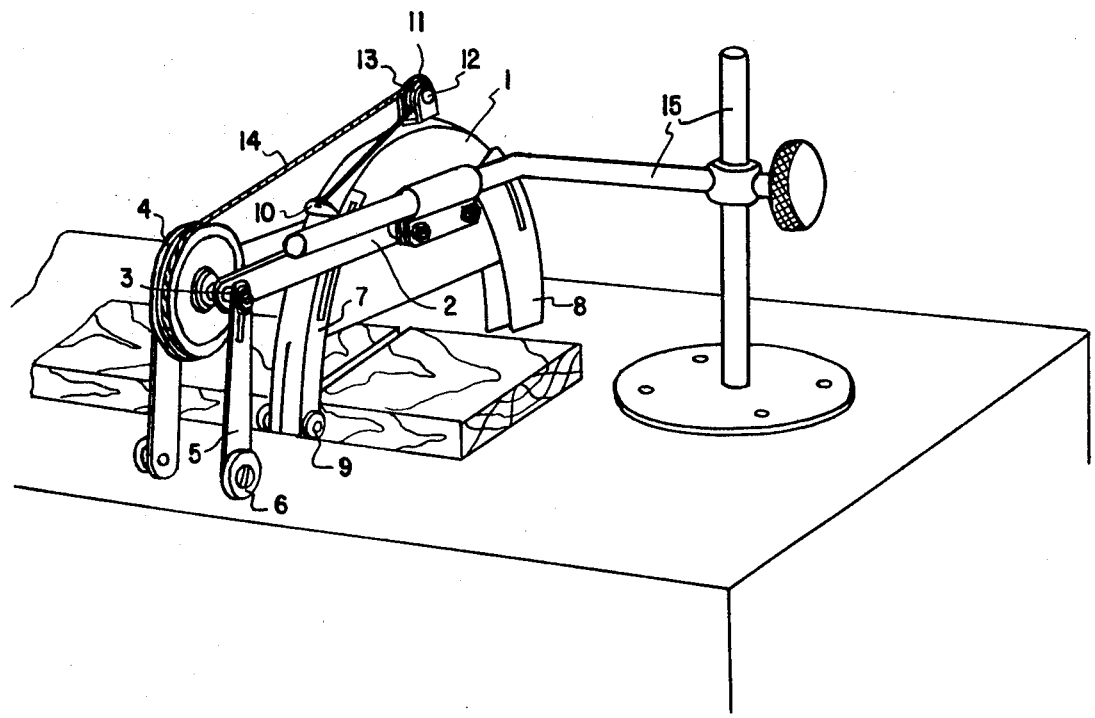
FIG. 3 is a perspective view of the safety device according to the present invention showing its arrangement with respect to the workpiece at the end of the sawing operation.

Referring to FIG. 3, this shows the arrangement of the safety device according to the present invention with respect to the workpiece near the end of the sawing operation. As can be seen, the rotatable feeler arms 5 have returned from on top of the workpiece to the fixed surface associated with the saw (not shown). Moreover, the slideable guard member 7 has also returned automatically to the fixed surface from on top of the workpiece. In this position, the slideable guard member 7 is again in its initial safety position covering the forward edge of the saw (not shown).

The safety device according to the present invention has several advantages. One of these advantages is that when the saw is not being utilized all of the teeth on the saw are covered. This serves the dual purpose of protecting those who may be working around the saw as well as protecting the saw itself.

Another advantage of the safety device according to the present invention is that during a sawing operation the saw is only uncovered to that extent which corresponds to the particular thickness of the workpiece being sawed.

Another advantage of the safety device according to the present invention is that once the workpiece has passed beyond the rollers of the feeler arms, the arms return automatically to their initial position on the fixed surface associated with the saw and thus serve to warn the saw operator of the fact that the workpiece has passed beyond the feeler arms into the immediate proximity of the saw.

Another advantage of the present invention is that once the workpiece being cut has passed beyond the rollers of the slideable guard member which covers the forward edge of the saw, the slideable guard member is also automatically moved back to the initial safety position in which it covers the forward edge or teeth of the saw. The slideable guard member assumes this safety position immediately prior to the sawing operation being completed. This insures that the saw operator is adequately protected at this critical phase of the sawing operation.

The safety device of the present invention also has the advantages that it allows the sawing of workpieces which have a greater diameter than that of the saw; that it does not allow sawdust to be thrown towards the saw operators; and that the waste materials resulting from the sawing operation are automatically kept clear of the teeth at the rearward edge or part of the saw.

It will be understood that the above description of the present invention is susceptible to various modifications, changes and adaptations.

I claim:

1. A safety device for use with a circular cutting saw, comprising in combination:
   a. support means extending forwardly of the saw with respect to the direction in which a workpiece is fed thereto;
   b. pulley means rotatably mounted on said support means forwardly of the saw;
   c. feeler means connected to said pulley means for rotation therewith and extending forwardly of said saw in the path of a workpiece being fed thereto;
   d. guard means including a fixed member covering the saw and connected to said support means, said guard means having a slideable member which is movable relative to said fixed member into and out of a safety position in which said slidable member covers the forward edge of the saw; and
   e. cable means connecting said pulley means to said slideable guard member for moving the same out of its safety position when said feeler means is contacted by a workpiece being fed to the saw and is rotated toward the saw and thus rotates said pulley means, in consequence of which said slideable guard member is moved out of its safety position to an extent which is a function of the angle through which said feeler means is rotated by the workpiece being moved toward the saw.

2. Safety device as defined in claim 1 wherein said support means includes two rigid, coextensive support members each having a free end forwardly of the saw and each one being on a respective side of the saw.

3. Safety device as defined in claim 2 wherein said pulley means includes a shaft rotatably mounted near the free ends of said support members, each end of said support member being connected to a respective one of said shaft and a pulley rigidly disposed on said shaft, between the support members, and rotatable therewith.

4. Safety device as defined in claim 3 wherein said feeler means includes two coextensive arms which reach forwardly of the saw and into the path of a workpiece being fed to the saw, each of said arms being connected at one end to a respective one of the ends of said shaft, said arms being rotatable with said shaft and being so rotated when a workpiece is moved toward the saw.

5. Safety device as defined in claim 4 wherein each of said arms includes a roller mounted at its other end.

6. Safety device as defined in claim 4 wherein said fixed member has a guide track and said slideable guard member has a portion extending into said guide track for movement therealong when moved into and out of the safety position with respect to the front edge of the saw.

7. Safety device as defined in claim 6 wherein said fixed and slideable guard members are generally arcuately shaped to correspond to the configuration of the circular saw.

8. Safety device as defined in claim 6 wherein said slideable guard member includes a connecting element said cable means being connected thereto and a free end having two rollers disposed thereon to facilitate the passing of the workpiece thereunder while being moved toward the saw.

9. Safety device as defined in claim 8 wherein said connecting element is a piece having a hole therethrough provided near the end of the slideable guard member opposite to its free end.

10. Safety device as defined in claim 8 wherein said cable means includes a pulley assembly mounted on said fixed guard member rearwardly of both said connecting element and said pulley means pulley and a cable wound around said pulley means pulley reaching rearwardly therefrom to said pulley assembly, said cable reaching forwardly again from said pulley assembly to said connecting element, said cable being wound around said pulley means pulley in a direction to exert a force via said pulley assembly on said slideable guard member to move the same out of its safety position at the forward edge of the saw when a workpiece being moved toward the saw causes said feeler arms, hence said pulley, to rotate.